United States Patent
Lee et al.

(10) Patent No.: US 11,664,933 B2
(45) Date of Patent: *May 30, 2023

(54) METHOD AND APPARATUS FOR FLUSHING HARQ BUFFER IN WIRELESS COMMUNICATION SYSTEM

(71) Applicant: LG Electronics Inc., Seoul (KR)

(72) Inventors: Youngdae Lee, Seoul (KR); Seungjune Yi, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,467

(22) Filed: Jan. 11, 2022

(65) Prior Publication Data

US 2022/0131651 A1    Apr. 28, 2022

Related U.S. Application Data (63) Continuation of application No. 16/646,073, filed as application No. PCT/KR2018/011532 on Sep. 28, 2018, now Pat. No. 11,277,229.

(Continued)

(51) Int. Cl.
*H04L 1/18* (2023.01)
*H04L 1/1812* (2023.01)
(Continued)

(52) U.S. Cl.
CPC .......... *H04L 1/1812* (2013.01); *H04L 69/322* (2013.01); *H04W 28/0278* (2013.01); *H04W 76/14* (2018.02)

(58) Field of Classification Search
None
See application file for complete search history.

(56) References Cited

U.S. PATENT DOCUMENTS

2009/0086657 A1* 4/2009 Alpert ................... H04L 1/1877
370/310
2009/0300457 A1 12/2009 Kuo ....................... H04W 76/38
714/749

(Continued)

FOREIGN PATENT DOCUMENTS

EP        3206321         8/2017
WO    WO-2010017376 A1 *  2/2010 ........... H04L 1/1812
(Continued)

OTHER PUBLICATIONS

3GPP, "Evolved Universal Terrestrial Radio Access (E-UTRA); Medium Access Control (MAC) protocol specification", 3GPP TS 36.321 v14.3.0 Release 14, Jul. 2017 (Year: 2017).*

(Continued)

*Primary Examiner* — Jenkey Van
(74) *Attorney, Agent, or Firm* — Dentons US LLP (57) ABSTRACT

A method and apparatus for flushing a hybrid automatic repeat request (HARQ) buffer in a wireless communication system is provided. A user equipment (UE) receives information on multiple resource pools from a network, selects a first resource pool among the multiple resource pools, and stores a media access control (MAC) protocol data unit (PDU) in the HARQ buffer for transmission via the first resource pool. When the UE reselects a second resource pool among the multiple resource pools, the UE flushes the HARQ buffer.

20 Claims, 8 Drawing Sheets

Related U.S. Application Data (60) Provisional application No. 62/565,113, filed on Sep. 29, 2017.

(51) Int. Cl.
*H04W 76/14* (2018.01)
*H04L 69/322* (2022.01)
*H04W 28/02* (2009.01)

(56) References Cited

U.S. PATENT DOCUMENTS

| | | | |
|---|---|---|---|
| 2015/0016318 A1* | 1/2015 | Lee | H04L 1/1861 370/280 |
| 2016/0029413 A1 | 1/2016 | Wang et al. | |
| 2016/0128082 A1 | 5/2016 | Chen et al. | |
| 2018/0279275 A1* | 9/2018 | Chen | H04W 72/23 |
| 2018/0352556 A1* | 12/2018 | Loehr | H04L 1/1835 |
| 2019/0068334 A1 | 2/2019 | Stern-Berkowitz | H04L 1/1812 |
| 2019/0191429 A1 | 6/2019 | Stern-Berkowitz | H04W 72/048 |
| 2019/0191442 A1 | 6/2019 | Lu | H04W 72/087 |
| 2020/0068581 A1 | 2/2020 | Xu | H04L 49/552 |

FOREIGN PATENT DOCUMENTS

| | | | |
|---|---|---|---|
| WO | 2016122162 | 8/2016 | |
| WO | WO-2016122162 A1 * | 8/2016 | H04L 1/1851 |

OTHER PUBLICATIONS

ETSI, "LTE; Evolved Universal Terrestrial Radio Access (E-UTRA); Medium Access Control (MAC) protocol specification," 3GPP TS 36.321 v.12.8.0 Release 12, Jan. 2016, see pp. 21, 37, 42; and figures 6.1.3.4-1.

3GPP, "Evolved Universal Terrestrial Radio Access (E-UTRA); Medium Access Control (MAC) protocol specification",(3GPP TS 36.321 version 14.3.0 Release 14) , Jul. 2017 (Year: 2017).

"Medium Access Control (MAC) protocol specification", 3GPP TS 36.321 V14.1.0, Dec. 2016 (Year: 2016).

* cited by examiner

METHOD AND APPARATUS FOR FLUSHING HARQ BUFFER IN WIRELESS COMMUNICATION SYSTEM

This application is a Continuation of U.S. patent application Ser. No. 16/646,073 filed on Mar. 10, 2020, which is the National Stage filing under 35 U.S.C. 371 of International Application No. PCT/KR2018/011532 filed on Sep. 28, 2018, which claims the benefit of U.S. Provisional Application No. 62/565,113 filed on Sep. 29, 2017, the contents of which are all hereby incorporated by reference herein in their entirety.

TECHNICAL FIELD

The present invention relates to wireless communications, and more particularly, to a method and apparatus for flushing a hybrid automatic repeat request (HARQ) buffer in a wireless communication system, when a resource pool or a carrier changes.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China. 3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

SUMMARY

Carrier aggregation (CA) in sidelink for V2X sidelink communication may be supported. Multiple transmission carriers may be selected and carrier reselection may be performed. When carrier reselection is performed, it may be possible that initial transmission and re-transmission of the same data are performed on different carriers, which should be avoided.

In an aspect, a method for flushing a hybrid automatic repeat request (HARQ) buffer by a user equipment (UE) in a wireless communication system is provided. The method includes receiving information on multiple resource pools from a network, selecting a first resource pool among the multiple resource pools, storing a media access control (MAC) protocol data unit (PDU) in the HARQ buffer for transmission via the first resource pool, reselecting a second resource pool among the multiple resource pools, and flushing the HARQ buffer.

In another aspect, a user equipment (UE) in a wireless communication system is provided. The UE includes a memory, a transceiver, and a processor, operably coupled to the memory and the transceiver, that controls the transceiver to receive information on multiple resource pools from a network, selects a first resource pool among the multiple resource pools, stores a media access control (MAC) protocol data unit (PDU) in a hybrid automatic repeat request (HARQ) buffer for transmission via the first resource pool, reselects a second resource pool among the multiple resource pools, and flushes the HARQ buffer.

Re-transmission on different carrier can be avoided.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems.

The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
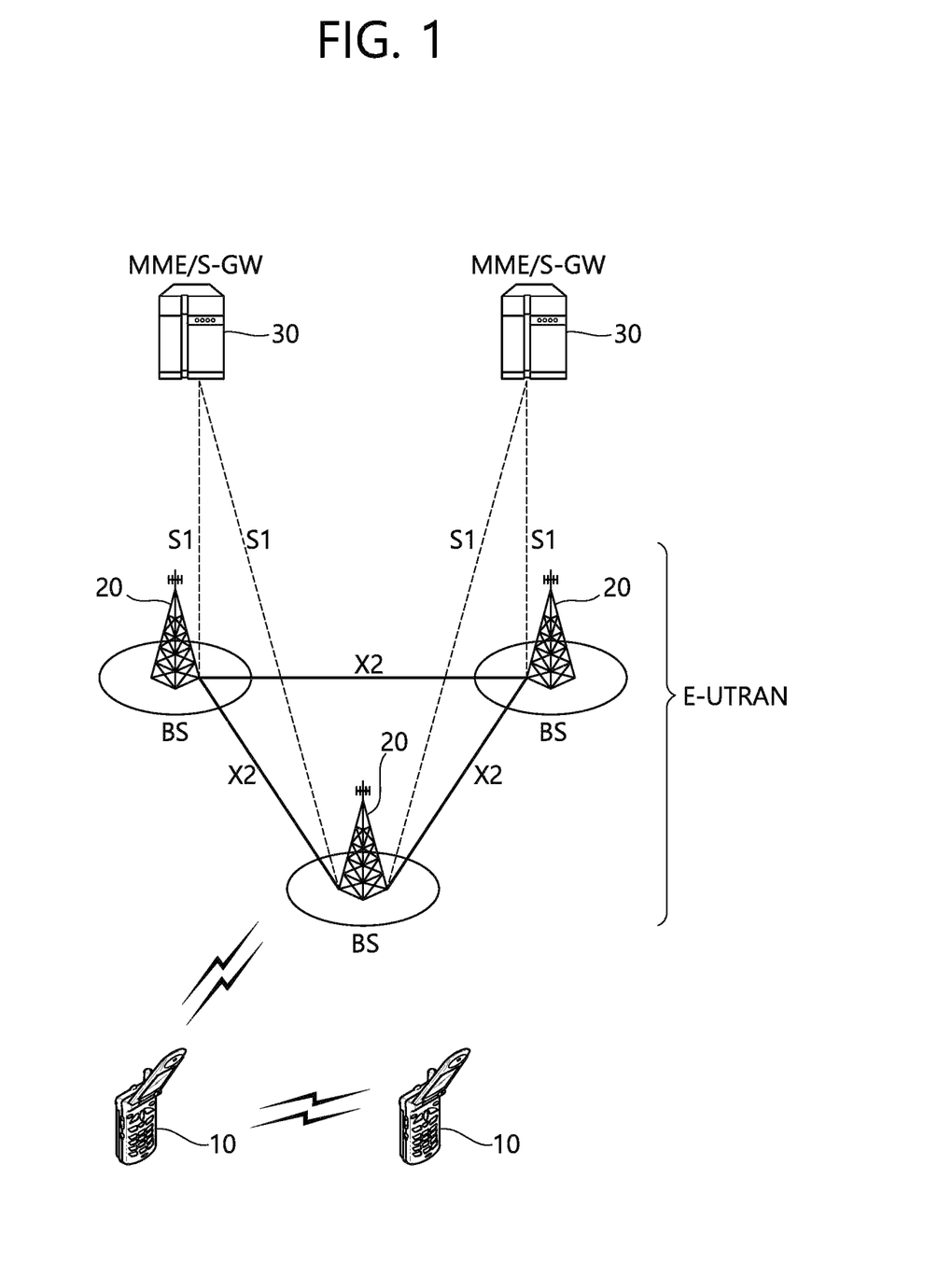
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
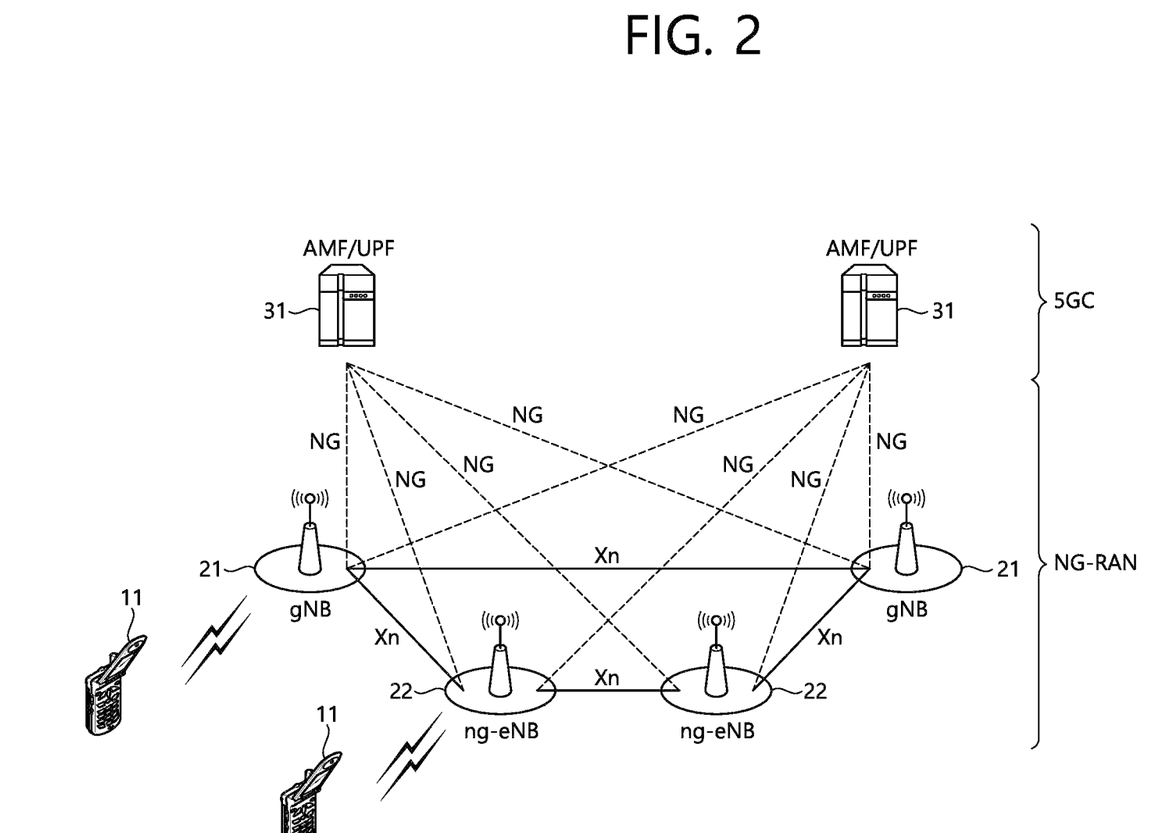
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
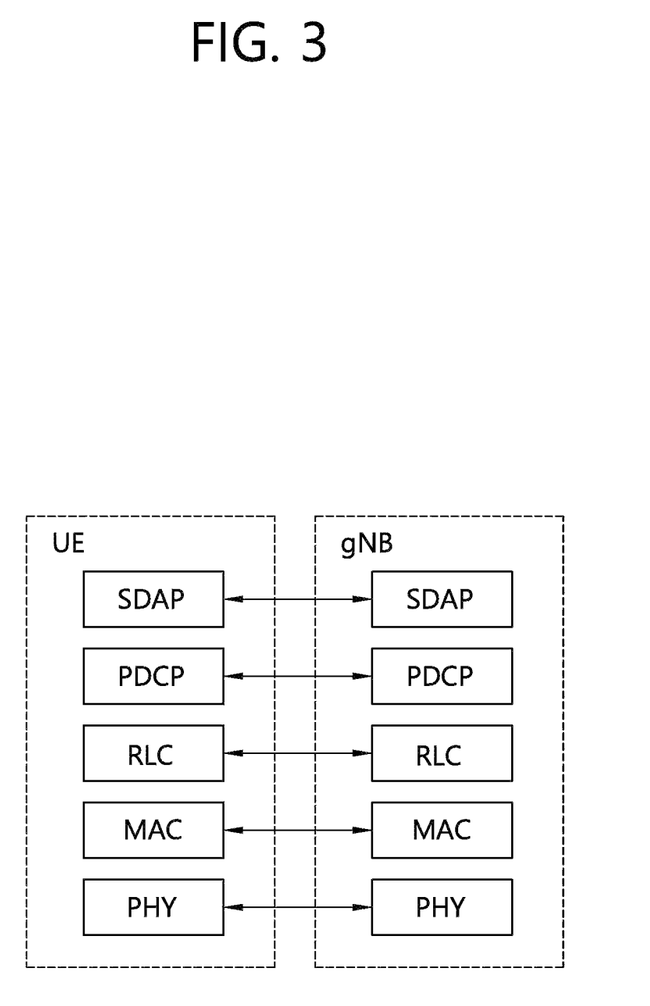
FIG. 3 shows a block diagram of a user plane protocol stack to which technical features of the present invention can be applied.
Figure 4:
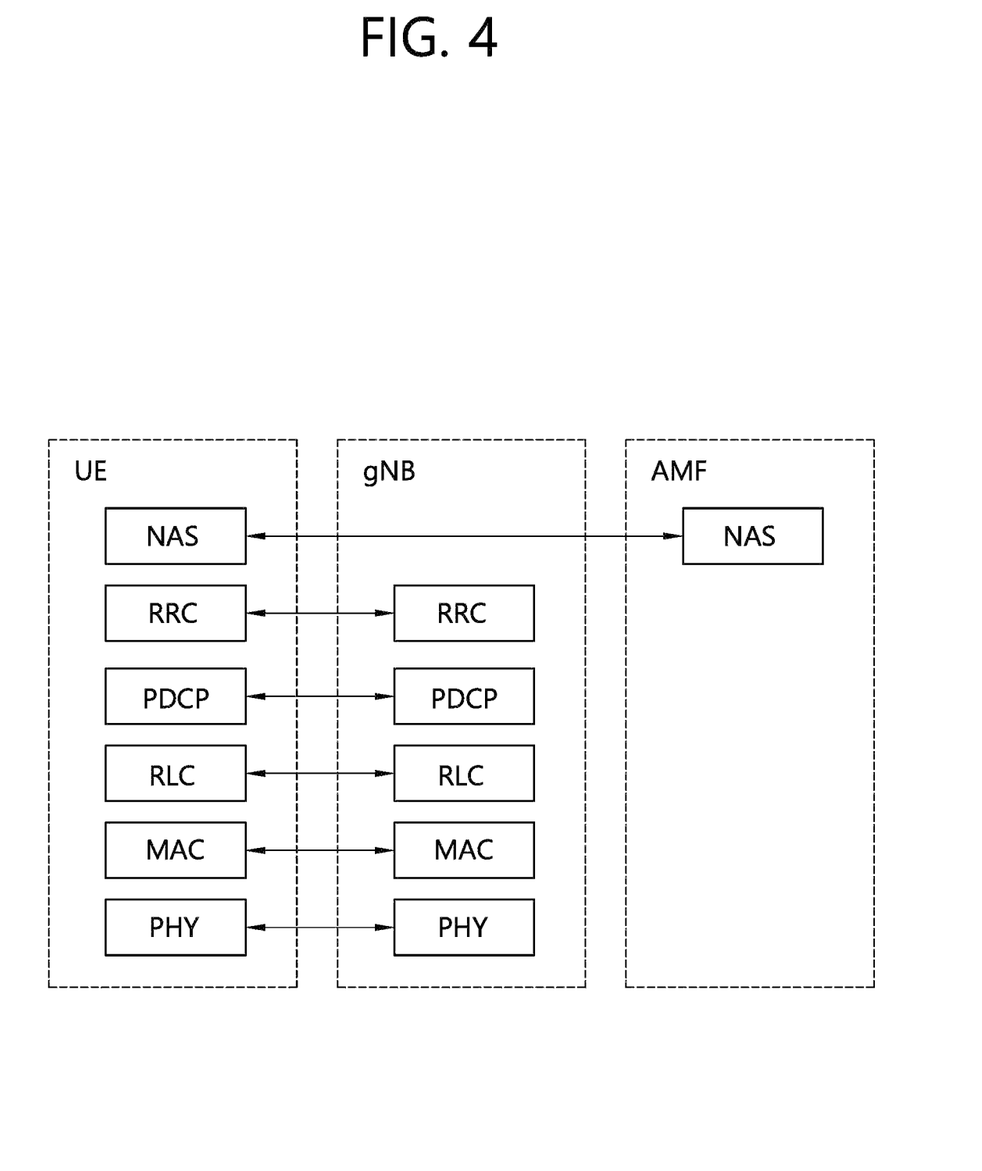
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method.

Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signaled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaption applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre) configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

For sidelink transmission and/or V2X sidelink transmission, the MAC entity shall for each subframe:
1> if the MAC entity has a configured sidelink grant occurring in this subframe:
2> if the configured sidelink grant corresponds to transmission of SCI:
3> instruct the physical layer to transmit SCI corresponding to the configured sidelink grant;
3> for V2X sidelink communication, deliver the configured sidelink grant and the associated HARQ information to the Sidelink HARQ entity for this subframe;
2> else if the configured sidelink grant corresponds to transmission of first transport block for sidelink communication:
3> deliver the configured sidelink grant and the associated HARQ information to the Sidelink HARQ entity for this subframe.

A problem of the prior art or a problem to be solved is described. According to the prior art, i.e. before Rel-14, a resource pool is configured only on a single carrier. That is, the UE chooses a single transmission carrier to perform sidelink transmission and re-transmission. The RRC layer of the UE (hereinafter, simply UE RRC) selects a resource pool on a single carrier. Then, the MAC layer of the UE (hereinafter, simply UE MAC) performs resource (re-)selection on the selected pool, and performs sidelink transmission by using the selected resource.

In Rel-15, it has been discussed to introduce carrier aggregation (CA) in sidelink for V2X sidelink communication. CA in sidelink for V2X sidelink communication may apply to both in coverage UEs and out of coverage UEs. In CA in sidelink for V2X sidelink communication, each resource pool (pre)configured for V2X sidelink communication transmission or reception may be associated to a single carrier.

If CA in sidelink for V2X sidelink communication is introduced, the UE may perform parallel transmissions on different carriers. The UE can select multiple transmission carriers and perform carrier reselection. The UE may select resources on each carrier/resource pool independently.

Meanwhile, if the sidelink HARQ entity requests a new transmission, the sidelink process shall store the MAC PDU in the associated HARQ buffer and generate a transmission with the sidelink grant. Then, if the sidelink HARQ entity requests a retransmission, the sidelink process shall generate a re-transmission. If CA in sidelink for V2X sidelink communication is introduced, after the UE performs initial transmission of a MAC PDU stored in HARQ buffer on a carrier, the UE may reselect another carrier and perform re-transmission on another carrier. However, such re-transmission on different carrier should not be allowed. That is, due to carrier reselection, the UE may perform initial transmission and re-transmission of the same MAC PDU on different carriers.

In addition, mapping between services and carriers may be introduced in Rel-15. Thus, a MAC PDU carrying a service should be transmitted on a carrier associated with the service. However, after initial transmission of the MAC PDU, the UE may reselect another carrier which is not mapped to the service associated with the MAC PDU stored in a HARQ buffer. In this case, the MAC PDU should not be transmitted on the reselected carrier.

In order to solve the problem described above, the present invention proposes to flush HARQ buffer after carrier reselection. That is, if the transmission carrier (re-) selection procedure is triggered for the sidelink process, the sidelink process may flush the associated HARQ buffer. If a resource pool or a carrier is re-configured for resource allocation or transmission, the UE may flush one or more HARQ buffers.

Figure 5:
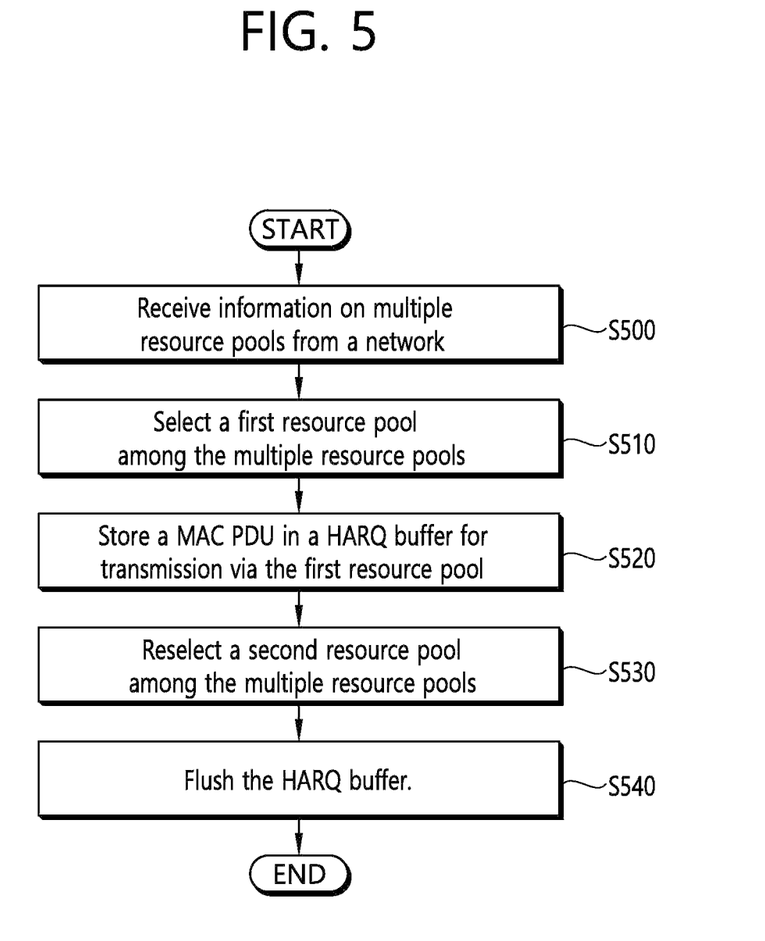
FIG. 5 shows a method for flushing a HARQ buffer by a UE according to an embodiment of the present invention.

FIG. 5 shows a method for flushing a HARQ buffer by a UE according to an embodiment of the present invention.

In step S500, the UE receives information on multiple resource pools from a network.

More specifically, the UE RRC may receive information/configuration on one or more resource pools and/or one or more carriers for sidelink resource allocation or sidelink transmission from a base station. The base station may be eNB and/or gNB. The information/configuration on one or more resource pools and/or one or more carriers may be received via system information or UE-dedicated message.

In step S510, the UE selects a first resource pool among the multiple resource pools. More specifically, upon receiving the information/configuration on one or more resource pools and/or one or more carriers, the UE RRC configures and/or selects one or more resource pool(s) and/or one or more carrier(s) based on the information/configuration on one or more resource pools and/or one or more carriers. It is assumed that the first resource pool is configured/selected among the one or more resource pools. Then, the UE RRC configures UE MAC with the selected resource pool (s) and/or the selected carrier(s). Then, the UE MAC selects sidelink grant(s) on the configured resource pool(s) and/or the configured carrier(s).

In step S520, the UE stores a MAC PDU in a HARQ buffer for transmission via the first resource pool. The UE performs HARQ (re-)transmission of the stored MAC PDU based on the sidelink grant on the first resource pool. The MAC PDU may contain at least a part of a destination layer 2 identifier (ID) and/or a MAC service data unit (SDU) of sidelink traffic channel (STCH) associated with the destination layer 2 ID.

More specifically, the UE MAC may deliver the selected sidelink grant to the sidelink HARQ entity associated with the configured resource pool(s) and/or the configured carrier(s). If a sidelink grant related to a new transmission opportunity has been indicated for this sidelink process and there is sidelink data, the sidelink HARQ entity in the UE may obtain the MAC PDU and then delivers the MAC PDU and the sidelink grant to the sidelink process. The sidelink HARQ entity in the UE may instruct this sidelink process to trigger a new transmission. If the sidelink HARQ entity requests a new transmission, the sidelink process may store the MAC PDU in the associated HARQ buffer, store the sidelink grant received from the sidelink HARQ entity, and generate a sidelink transmission.

In step S530, the UE reselects a second resource pool among the multiple resource pools. More specifically, the UE RRC reselects one or more resource pool(s) and/or one or more carrier(s), and then, reconfigures the UE MAC with the selected resource pool(s) and/or the selected carrier(s).

If one or more resource pools and/or one or more carriers are re-configured, i.e. reselecting the second resource pool, in step S540, the UE flushes the HARQ buffer. Alternatively, if one or more resource pools and/or one or more carriers are re-configured and if the re-configured resource pool(s) and/or the re-configured carrier is not mapped to destination layer 2 ID of the MAC PDU or the STCH, the UE flushes the HARQ buffer. Otherwise, the UE does not flushes the HARQ buffer.

More specifically, if the selected resource pool(s) and/or the selected carrier(s) is reconfigured, i.e. the previously configured resource pool(s) and/or the previously configured carrier(s) is replaced by the reconfigured resource pool(s) and/or the reconfigured carrier(s), the UE MAC may flush all HARQ buffers in the MAC entity. The sidelink HARQ entity may flush all HARQ buffers in the HARQ entity. The UE MAC may perform sidelink MAC reset. The sidelink HARQ entity flushing all HARQ buffers may be associated with the previously configured resource pool(s) and/or the previously configured carrier(s). The UE MAC may flush only HARQ buffers of the sidelink HARQ entity associated with the previously configured resource pool(s) and/or the previously configured carrier(s).

Alternatively, 1) if the selected resource pool(s) and/or the selected carrier(s) is reconfigured, i.e. the previously configured resource pool(s) and/or the previously configured carrier(s) is replaced by the reconfigured resource pool(s) and/or the reconfigured carrier(s), and 2) if a MAC PDU is stored in a HARQ buffer of the sidelink HARQ entity, if the MAC PDU contains at least a part of a destination layer 2 ID and a MAC SDU of STCH associated with the destination layer 2 ID, and if all re-configured resource pool(s) and/or all re-configured carrier(s) are not mapped to destination layer 2 ID of the MAC PDU or the STCH, the UE MAC may flush all or the corresponding HARQ buffers in the MAC entity. The sidelink HARQ entity may flush all or the corresponding HARQ buffers in the HARQ entity. The UE MAC may perform sidelink MAC reset.

If the UE MAC performs sidelink MAC reset, the UE MAC may perform at least one of the followings.
  initialize values and parameters related to the sidelink HARQ entity (e.g. set CURRENT_IRV to 0 for each HARQ process of the sidelink HARQ entity); and/or
  stop all running timers related to sidelink transmissions; and/or
  stop sidelink transmissions on the configured resource pool(s) and/or the configured carrier(s); and/or
  flush all or the corresponding HARQ buffers in the MAC entity or in the sidelink HARQ entity.

According to the embodiment of the present invention described above, operations of the UE MAC is as follows.

The sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant and with the MCS configured by upper layers (if configured) unless selected below.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the sidelink HARQ entity requests a new transmission, the sidelink process shall:
  1> for V2X sidelink communication in UE autonomous resource selection (i.e. Mode 4):
    2> select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers if CBR measurement results are available or the corresponding defaultTxConfigIndex configured by upper layers if CBR measurement results are not available;

1> set CURRENT_IRV to 0;
1> store the MAC PDU in the associated HARQ buffer;
1> store the sidelink grant received from the sidelink HARQ entity;
1> generate a transmission as described below.

If the sidelink HARQ entity requests a retransmission, the sidelink process shall:

1> generate a transmission as described below.

To generate a transmission, the Sidelink process shall:

1> if there is no uplink transmission, or if the MAC entity is able to perform uplink transmissions and transmissions on sidelink shared channel (SL-SCH) simultaneously at the time of the transmission, or if there is a MAC PDU to be transmitted in this TTI in uplink, except a MAC PDU obtained from the Msg3 buffer and transmission of V2X sidelink communication is prioritized over uplink transmission; and 1> if there is no sidelink discovery gap for transmission or no transmission on physical sidelink discovery channel (PSDCH) at the time of the transmission, or, in case of transmissions of V2X sidelink communication, if the MAC entity is able to perform transmissions on SL-SCH and transmissions on PSDCH simultaneously at the time of the transmission:

2> instruct the physical layer to generate a transmission according to the stored sidelink grant with the redundancy version corresponding to the CURRENT_IRV value.

1> increment CURRENT_IRV by 1;
1> if this transmission corresponds to the last transmission of the MAC PDU:

2> decrement SL_RESOURCE_RESELECTION_COUNTER by 1, if available.

The transmission of V2X sidelink communication is prioritized over uplink transmission if the following conditions are met:

if the MAC entity is not able to perform uplink transmissions and transmissions of V2X sidelink communication simultaneously at the time of the transmission; and if uplink transmission is not prioritized by upper layer; and if the value of the highest priority of the sidelink logical channel(s) in the MAC PDU is lower than thresSL-TxPrioritization if thresSL-TxPrioritization is configured.

If the transmission carrier (re-)selection procedure is triggered for the sidelink process, the sidelink process shall flush the associated HARQ buffer.

According to embodiment of the present invention shown in FIG. 5, when resource pool(s) and/or carrier(s) for sidelink transmission are re-selected/re-configured due to transmission carrier (re-)selection procedure, re-transmission via the re-selected/re-configured resource pool(s) and/or carrier(s) can be avoided. In other words, initial transmission and re-transmission of the same MAC PDU on different resource pools and/or different carriers can be avoided. Furthermore, if services are associated with resource pools and/or carriers, and if another resource pool(s) and/or carrier(s) which is not mapped to the service associated with the MAC PDU is re-selected after initial transmission of the MAC PDU, transmission of the MAC PDU via the re-selected resource pool(s) and/or carrier(s) can be avoided. Consequently, waste of radio resources can be prevented.

Figure 6:
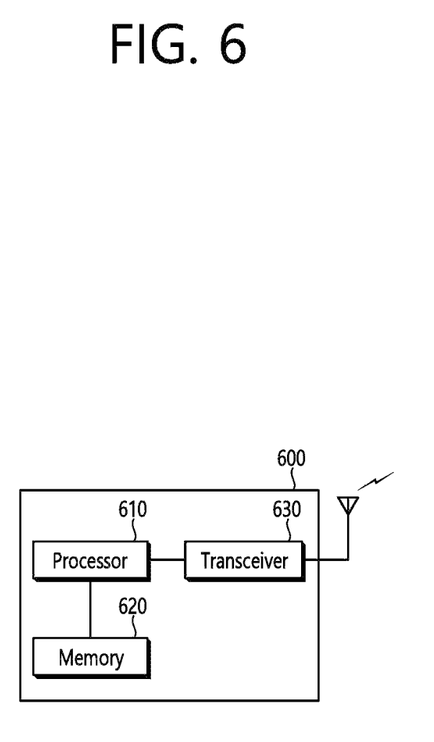
FIG. 6 shows a UE to implement an embodiment of the present invention. The present invention described above for UE side may be applied to this embodiment.

FIG. 6 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610. Specifically, the processor 610 controls the transceiver 630 to receive information on multiple resource pools from a network, selects a first resource pool among the multiple resource pools, stores a MAC PDU in a HARQ buffer for transmission via the first resource pool, reselects a second resource pool among the multiple resource pools, and flushes the HARQ buffer.

All HARQ buffers in the UE, including the HARQ buffer, may be flushed. The first resource pool may be associated with a sidelink HARQ entity. All HARQ buffers of the sidelink HARQ entity, including the HARQ buffer, may be flushed. The MAC PDU may contain at least a part of a destination layer 2 ID and a MAC SDU of a STCH associated with the destination layer 2 ID. In this case, the HARQ buffer may be flushed if the second resource pool is not mapped to the destination layer 2 ID of the MAC PDU or the STCH. The processor 610 may further perform a sidelink MAC reset.

The memory 620 is operatively coupled with the processor 610 and stores a variety of information to operate the processor 610. The transceiver 620 is operatively coupled with the processor 610, and transmits and/or receives a radio signal.

According to embodiment of the present invention shown in FIG. 6, when resource pool(s) and/or carrier(s) for sidelink transmission are re-selected/re-configured due to transmission carrier (re-)selection procedure, the processor 610 can control the transceiver 630 that re-transmission via the re-selected/re-configured resource pool(s) and/or carrier(s) can be avoided. In other words, the processor 610 can control the transceiver 630 that initial transmission and re-transmission of the same MAC PDU on different resource pools and/or different carriers can be avoided. Furthermore, if services are associated with resource pools and/or carriers, and if another resource pool(s) and/or carrier(s) which is not mapped to the service associated with the MAC PDU is re-selected after initial transmission of the MAC PDU, the processor 610 can control the transceiver 630 that transmission of the MAC PDU via the re-selected resource pool(s) and/or carrier(s) can be avoided. Consequently, waste of radio resources can be prevented.

Figure 7:
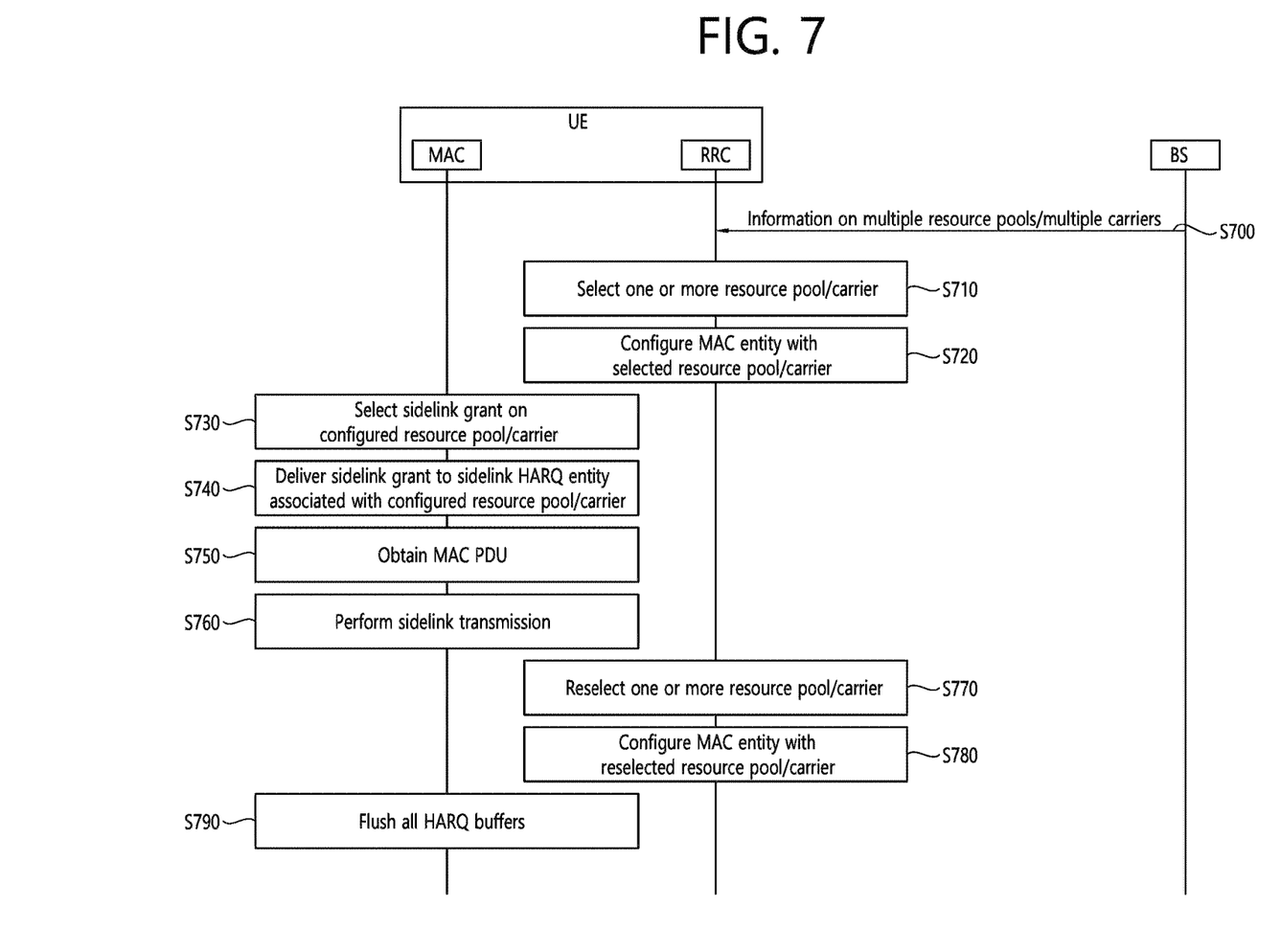
FIG. 7 shows a method for flushing a HARQ buffer by UE and BS according to an embodiment of the present invention.

FIG. 7 shows a method for flushing a HARQ buffer by UE and BS according to an embodiment of the present invention.

In step S700, the BS transmits information on multiple resource pools to the UE. More specifically, the BS transmits information/configuration on one or more resource pools and/or one or more carriers for sidelink resource allocation or sidelink transmission to the UE RRC. The base station may be eNB and/or gNB. The information/configuration on one or more resource pools and/or one or more carriers may be transmitted via system information or UE-dedicated message.

Upon receiving the information/configuration on one or more resource pools and/or one or more carriers, in step S710, the UE RRC configures and/or selects one or more resource pool(s) and/or one or more carrier(s) based on the information/configuration on one or more resource pools and/or one or more carriers.

In step S720, the UE RRC configures UE MAC with the selected resource pool (s) and/or the selected carrier(s).

In step S730, the UE MAC selects sidelink grant(s) on the configured resource pool(s) and/or the configured carrier(s).

In step S740, the UE MAC delivers the selected sidelink grant to the sidelink HARQ entity associated with the configured resource pool(s) and/or the configured carrier(s).

If a sidelink grant related to a new transmission opportunity has been indicated for this sidelink process and there is sidelink data, in step S750, the sidelink HARQ entity in the UE MAC obtains the MAC PDU. The MAC PDU may contain at least a part of a destination layer 2 ID and/or a MAC SDU of STCH associated with the destination layer 2 ID.

In step S760, the UE MAC performs sidelink transmission of the stored MAC PDU.

Specifically, the UE MAC delivers the MAC PDU and the sidelink grant to the sidelink process. The sidelink HARQ entity in the UE may instruct this sidelink process to trigger a new transmission. If the sidelink HARQ entity requests a new transmission, the sidelink process may store the MAC PDU in the associated HARQ buffer, store the sidelink grant received from the sidelink HARQ entity, and generate a sidelink transmission. The UE performs HARQ (re-)transmission of the stored MAC PDU based on the sidelink grant on the configured resource pool(s) and/or the configured carrier(s).

In step S770, the UE RRC reselects one or more resource pool(s) and/or one or more carrier(s).

In step S780, the UE RRC reconfigures the UE MAC with the selected resource pool(s) and/or the selected carrier(s).

In step S790, if the selected resource pool(s) and/or the selected carrier(s) is reconfigured, i.e. the previously configured resource pool(s) and/or the previously configured carrier(s) is replaced by the reconfigured resource pool(s) and/or the reconfigured carrier(s), the UE MAC flushes all HARQ buffers in the MAC entity. The sidelink HARQ entity may flush all HARQ buffers in the HARQ entity. The UE MAC may perform sidelink MAC reset. The sidelink HARQ entity flushing all HARQ buffers may be associated with the previously configured resource pool(s) and/or the previously configured carrier(s). The UE MAC may flush only HARQ buffers of the sidelink HARQ entity associated with the previously configured resource pool(s) and/or the previously configured carrier(s).

Alternatively, 1) if the selected resource pool(s) and/or the selected carrier(s) is reconfigured, i.e. the previously configured resource pool(s) and/or the previously configured carrier(s) is replaced by the reconfigured resource pool(s) and/or the reconfigured carrier(s), and 2) if a MAC PDU is stored in a HARQ buffer of the sidelink HARQ entity, if the MAC PDU contains at least a part of a destination layer 2 ID and a MAC SDU of STCH associated with the destination layer 2 ID, and if all re-configured resource pool(s) and/or all re-configured carrier(s) are not mapped to destination layer 2 ID of the MAC PDU or the STCH, the UE MAC flushes all or the corresponding HARQ buffers in the MAC entity. The sidelink HARQ entity may flush all or the corresponding HARQ buffers in the HARQ entity. The UE MAC may perform sidelink MAC reset.

If the UE MAC performs sidelink MAC reset, the UE MAC may perform at least one of the followings.

initialize values and parameters related to the sidelink HARQ entity (e.g. set CURRENT_IRV to 0 for each HARQ process of the sidelink HARQ entity); and/or stop all running timers related to sidelink transmissions; and/or stop sidelink transmissions on the configured resource pool(s) and/or the configured carrier(s); and/or flush all or the corresponding HARQ buffers in the MAC entity or in the sidelink HARQ entity.

According to embodiment of the present invention shown in FIG. 7, when resource pool(s) and/or carrier(s) for sidelink transmission are re-selected/re-configured due to transmission carrier (re-)selection procedure, re-transmission via the re-selected/re-configured resource pool(s) and/or carrier(s) can be avoided. In other words, initial transmission and re-transmission of the same MAC PDU on different resource pools and/or different carriers can be avoided. Furthermore, if services are associated with resource pools and/or carriers, and if another resource pool(s) and/or carrier(s) which is not mapped to the service associated with the MAC PDU is re-selected after initial transmission of the MAC PDU, transmission of the MAC PDU via the re-selected resource pool(s) and/or carrier(s) can be avoided. Consequently, waste of radio resources can be prevented.

Figure 8:
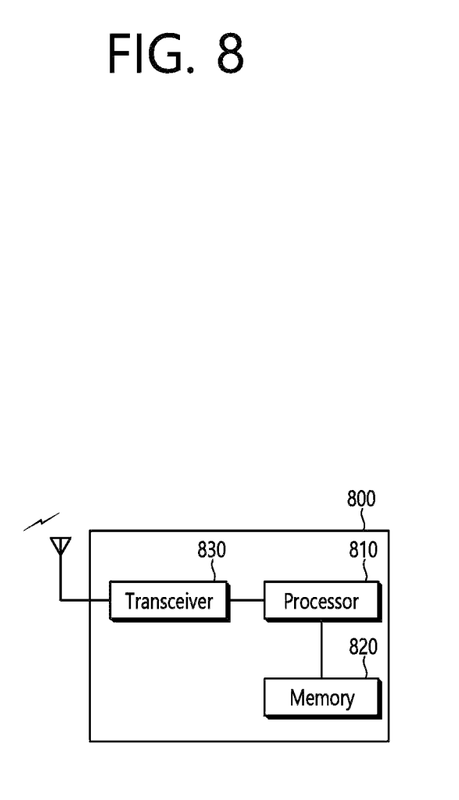
FIG. 8 shows a BS to implement an embodiment of the present invention. The present invention described above for BS side may be applied to this embodiment.

FIG. 8 shows a BS to implement an embodiment of the present invention. The present invention described above for BS side may be applied to this embodiment.

A BS 800 includes a processor 810, a memory 820 and a transceiver 830. The processor 810 may be configured to implement proposed functions, procedures and/or methods described in this description. Layers of the radio interface protocol may be implemented in the processor 810. Specifically, the processor 810 controls the transceiver 830 to transmit information on multiple resource pools to a UE.

The memory 820 is operatively coupled with the processor 810 and stores a variety of information to operate the processor 810. The transceiver 820 is operatively coupled with the processor 810, and transmits and/or receives a radio signal.

The processors 610, 810 may include application-specific integrated circuit (ASIC), other chipset, logic circuit and/or data processing device. The memories 620, 820 may include read-only memory (ROM), random access memory (RAM), flash memory, memory card, storage medium and/or other storage device. The transceivers 630, 830 may include baseband circuitry to process radio frequency signals. When the embodiments are implemented in software, the techniques described herein can be implemented with modules (e.g., procedures, functions, and so on) that perform the functions described herein. The modules can be stored in memories 620, 820 and executed by processors 610, 810. The memories 620, 820 can be implemented within the processors 610, 810 or external to the processors 610, 810 in which case those can be communicatively coupled to the processors 610, 810 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for flushing a hybrid automatic repeat request (HARQ) buffer by a user equipment (UE) in a wireless communication system, the method comprising:
   receiving information on multiple resource pools from a network;
   selecting a resource pool among the multiple resource pools;
   storing a medium access control (MAC) protocol data unit (PDU) in the HARQ buffer for a new transmission; and
   based on the selected resource pool being reconfigured, flushing the HARQ buffer associated with the new transmission.

2. The method of claim 1,
   wherein the UE includes multiple HARQ buffers, and
   wherein the step of flushing the HARQ buffer includes flushing all of the multiple HARQ buffers including the HARQ buffer associated with the new transmission.

3. The method of claim 1, wherein the selected resource pool is associated with a sidelink HARQ entity.

4. The method of claim 3,
   wherein the UE includes multiple HARQ buffers, and
   wherein the step of flushing the HARQ buffer includes flushing one or more HARQ buffers associated with the sidelink HARQ entity among the multiple HARQ buffers.

5. The method of claim 1, wherein the MAC PDU contains at least a part of a destination layer 2 identifier (ID) and a MAC service data unit (SDU) of a sidelink traffic channel (STCH) associated with the destination layer 2 ID.

6. The method of claim 5, wherein the HARQ buffer is flushed based on the selected resource pool not being mapped to the destination layer 2 ID of the MAC PDU or the STCH.

7. The method of claim 1, further comprising: performing a sidelink MAC reset.

8. The method of claim 1, wherein the UE is in communication with at least one of a mobile device, a network, and/or autonomous vehicles other than the UE.

9. The method of claim 1, wherein the method further comprises, reconfiguring the selected resource pool, by replacing the selected resource pool with another resource pool among the multiple resource pools.

10. A user equipment (UE) in a wireless communication system, the UE comprising:
    a memory;
    a transceiver; and
    a processor, operably coupled to the memory and the transceiver, that:
    controls the transceiver to receive information on multiple resource pools from a network,
    selects a resource pool among the multiple resource pools,
    stores a medium access control (MAC) protocol data unit (PDU) in a hybrid automatic repeat request (HARQ) buffer for a new transmission, and
    based on the selected resource pool being reconfigured, flushes the HARQ buffer associated with the new transmission.

11. The UE of claim 10,
    wherein the UE includes multiple HARQ buffers, and
    wherein the step of flushing the HARQ buffer includes flushing all of the multiple HARQ buffers including the HARQ buffer associated with the new transmission.

12. The UE of claim 10, wherein the selected resource pool is associated with a sidelink HARQ entity.

13. The UE of claim 12,
    wherein the UE includes multiple HARQ buffers, and
    wherein the step of flushing the HARQ buffer includes flushing one or more HARQ buffers associated with the sidelink HARQ entity among the multiple HARQ buffers.

14. The UE of claim 10, wherein the MAC PDU contains at least a part of a destination layer 2 identifier (ID) and a MAC service data unit (SDU) of a sidelink traffic channel (STCH) associated with the destination layer 2 ID.

15. The UE of claim 14, wherein the HARQ buffer is flushed based on the selected resource pool not being mapped to the destination layer 2 ID of the MAC PDU or the STCH.

16. The UE of claim 10, wherein the processor further performs a sidelink MAC reset.

17. A processor for a user equipment (UE) in a wireless communication system, wherein the processor is configured to control the UE to perform operations comprising:
    receiving information on multiple resource pools from a network;
    selecting a resource pool among the multiple resource pools;
    storing a medium access control (MAC) protocol data unit (PDU) in a hybrid automatic repeat request (HARQ) buffer for a new transmission; and
    based on the selected resource pool being reconfigured, flushing the HARQ buffer associated with the new transmission.

18. The processor of claim 17,
    wherein the UE includes multiple HARQ buffers, and
    wherein the step of flushing the HARQ buffer includes flushing all of the multiple HARQ buffers including the HARQ buffer associated with the new transmission.

19. The processor of claim 17, wherein the selected resource pool is associated with a sidelink HARQ entity.

20. The processor of claim 19,
    wherein the UE includes multiple HARQ buffers, and
    wherein the step of flushing the HARQ buffer includes flushing one or more HARQ buffers associated with the sidelink HARQ entity among the multiple HARQ buffers.

* * * * *